US012725474B2

(12) United States Patent
Furtwaengler et al.

(10) Patent No.: US 12,725,474 B2
(45) Date of Patent: Sep. 1, 2026

(54) WIRELESS KEY FOR UNLOCKING A VEHICLE AND/OR FOR ENABLING A FUNCTION OF THE VEHICLE

(71) Applicant: MARQUARDT GMBH, Rietheim-Weilheim (DE)

(72) Inventors: Fabian Furtwaengler, Balingen (DE); Jörg Fischer, Donaueschingen (DE); Tobias Schweizer, Tuttlingen (DE); Michael Rosenfelder, Spaichingen (DE); Roland Moser, Meßstetten (DE); Antoine Bacle, Chauray (FR)

(73) Assignee: MARQUARDT GMBH, Rietheim-Weilheim (DE)

( * ) Notice: Subject to any disclaimer, the term of this patent is extended or adjusted under 35 U.S.C. 154(b) by 0 days.

(21) Appl. No.: 18/856,945

(22) PCT Filed: Mar. 29, 2023

(86) PCT No.: PCT/EP2023/058172

§ 371 (c)(1),
(2) Date: Oct. 15, 2024

(87) PCT Pub. No.: WO2023/202852

PCT Pub. Date: Oct. 26, 2023

(65) Prior Publication Data

US 2025/0265877 A1 Aug. 21, 2025

(30) Foreign Application Priority Data

Apr. 21, 2022 (DE) ..................... 10 2022 109 617.3

(51) Int. Cl.
*G07C 9/00* (2020.01)
*H04W 4/80* (2018.01)

(52) U.S. Cl.
CPC . *G07C 9/00309* (2013.01); *G07C 2009/0038* (2013.01); *G07C 2009/00579* (2013.01); *H04W 4/80* (2018.02)

(58) Field of Classification Search
CPC ........ G07C 9/00309; G07C 2009/0038; G07C 2009/00579; H04W 4/80; Y02D 30/70; B60R 25/406

(Continued)

(56) References Cited

U.S. PATENT DOCUMENTS 9,082,241 B2 * 7/2015 Leong ..................... B60R 25/24
9,379,567 B2 * 6/2016 Kracker ................ B60R 25/406

(Continued)

FOREIGN PATENT DOCUMENTS

DE 202010010892 U1 11/2011
DE 102016112593 A1 1/2018

(Continued)

OTHER PUBLICATIONS

International Search Report of the ISA issued in PCT/EP2023/058172, mailed Jul. 10, 2023; ISA/EP.

*Primary Examiner* — Nam V Nguyen
(74) *Attorney, Agent, or Firm* — Harness, Dickey & Pierce, P.L.C.

(57) ABSTRACT

A wireless key (1) for unlocking a vehicle and/or for enabling a function of the vehicle. The wireless key (1) has a sensor (10) for motion detection, an evaluation unit (20), and a transceiver (30) which is designed to signal its availability as a connection partner and to wirelessly transmit data to a connection partner and/or to receive data from the connection partner. The transceiver (30) has at least one operating mode (A, B) and at least one sleep mode (C, D) where an energy requirement of the transceiver (30) is lower than in the at least one operating mode (A, B). The evalu- (Continued)

ation unit (20) is designed to switch the transceiver from the operating mode (A, B) to the sleep mode (C, D) if no movement is detected by the sensor (10) within a predetermined interval and to switch the transceiver (30) from the sleep mode (C, D) to the operating mode (A, B) if a movement is detected by the sensor (10).

4 Claims, 1 Drawing Sheet

(58) Field of Classification Search
USPC .......................................................... 340/5.61
See application file for complete search history.

(56) References Cited

U.S. PATENT DOCUMENTS

| | | | | |
|---|---|---|---|---|
| 9,961,636 | B2 * | 5/2018 | Matsuda | H04W 52/0219 |
| 10,375,219 | B2 * | 8/2019 | Kim | G06V 40/172 |
| 10,864,890 | B2 * | 12/2020 | Stef | G07C 9/00944 |
| 2014/0232322 | A1 | 8/2014 | Kracker et al. | |
| 2014/0368313 | A1 * | 12/2014 | Seiberts | G07C 9/00309 340/5.61 |
| 2021/0209873 | A1 | 7/2021 | Ghabra | |

FOREIGN PATENT DOCUMENTS

| | | | |
|---|---|---|---|
| DE | 102017201087 | B4 | 8/2019 |
| WO | 2020201085 | A1 | 10/2020 |

* cited by examiner

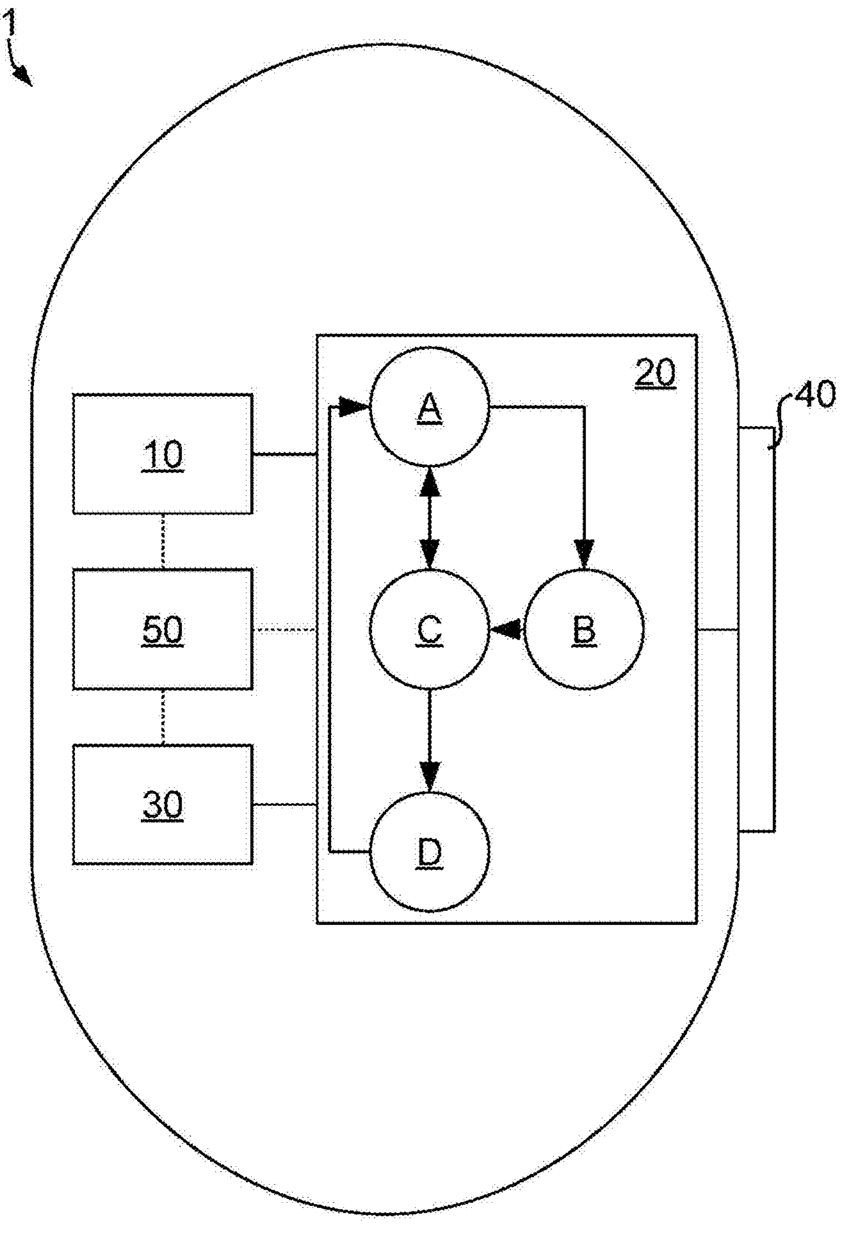
1
20
A
10
40
50
C
B
30
D

WIRELESS KEY FOR UNLOCKING A VEHICLE AND/OR FOR ENABLING A FUNCTION OF THE VEHICLE

CROSS-REFERENCE TO RELATED APPLICATIONS

This application is a 371 U.S. National Phase of International Application No. PCT/EP2023/058172, filed on Mar. 29, 2023 and also claims the benefit of German Application No. 10 2022 109 617.3, filed on Apr. 21, 2022. The entire disclosures of the above applications are incorporated herein by reference.

DESCRIPTION

The disclosure relates to a wireless key for unlocking a vehicle and/or for enabling a function of the vehicle.

A variety of different wireless keys for unlocking or operating vehicles are already known in the art. A mobile phone, for example, can serve as such a wireless key.

A fundamental problem exists, however, in that the necessary radio connection between the vehicle and the wireless key requires a relatively high amount of energy from the wireless key, so that its battery must be large or it will run out relatively quickly.

This means that wireless keys are subject to certain limitations in the current state of the art and have to be correspondingly large.

In particular, it is usually not possible to provide a comparatively small key fob that assumes the function of such a wireless key and can also be referred to as a smart fob.

It is therefore the object of the disclosure to overcome the aforementioned drawbacks and provide a wireless key for unlocking a vehicle and/or for enabling a function of the vehicle with the lowest possible energy requirement on the part of the mobile device.

This object is achieved by the combination of features according to claim 1.

According to the disclosure, a wireless key is therefore proposed for unlocking a vehicle and/or for enabling a function of the vehicle, with "enabling a function" also being understood to mean triggering a function of the vehicle. The wireless key has a sensor for motion detection, an evaluation unit, and a transceiver, the transceiver being designed to signal its availability as a connection partner and to wirelessly transmit data to a connection partner and/or to receive data from the connection partner. It should be noted that the transceiver takes on an advertising role by signaling its availability, which is usually not the case in the prior art. A vehicle or a transceiver of a vehicle with which the wireless key can connect and which is therefore a connection partner therefore preferably takes on a scanning role in order to establish the connection. According to the disclosure, the transceiver provides at least one operating mode and at least one sleep mode in which an energy requirement of the transceiver is lower than in the at least one operating mode. The evaluation unit is designed to switch the transceiver from the at least one operating mode to the at least one sleep mode if no movement is detected by the sensor within a predetermined interval and to switch the transceiver from the at least one sleep mode to the at least one operating mode if movement is detected by the sensor.

The combination of advertising role and shutdown in the absence of movement enables significant energy savings to be achieved compared to the prior art, so that the battery of the wireless key can be made smaller or have a longer service life without changing its size.

This means that a small wireless key or a smart fob can be provided as a wireless key.

An advantageous refinement makes a provision that the wireless key further comprises an actuatable switching element for enabling the function of the vehicle. The evaluation unit is further designed to switch the transceiver from the at least one sleep mode to the at least one operating mode when the switching element is actuated.

In addition, the transceiver can have a first sleep mode and a second sleep mode, the energy requirement of the transceiver being lower in the first sleep mode than in the at least one operating mode and lower in the second sleep mode than in the first sleep mode. Furthermore, the evaluation unit is designed to switch the transceiver from the first sleep mode to the second sleep mode if no movement is detected by the sensor within a predetermined second interval.

According to another advantageous variant, the transceiver is designed to disconnect a connection to the connection partner in the first sleep mode and to stop signaling availability as a connection partner.

The transceiver is preferably designed to connect to the connection partner more quickly after switching from the first sleep mode to the operating mode than after switching from the second sleep mode to the operating mode.

The transceiver can be an NFC and/or BLE and/or UWB transceiver.

Preferably, the transceiver is also designed to broadcast advertiser events on at least one advertiser channel at least until a connection is established in order, in particular, to thereby signal its availability as a connection partner.

The sensor can also be a motion sensor or an acceleration sensor.

Another aspect of the disclosure relates to a method for saving energy in a wireless key according to the invention. The transceiver is switched from operating mode to sleep mode by the evaluation unit if no movement is detected by the sensor within a predetermined interval. Furthermore, the transceiver is switched from sleep mode to operating mode when movement is detected by the sensor.

The features disclosed above can be combined as required, provided this is technically possible and they do not contradict one another.

Other advantageous refinements of the invention are characterized in the subclaims and/or depicted in greater detail below together with the description of the preferred embodiment of the invention with reference to the drawing. In the drawing:

FIG. 1 is a wireless key.

The figure is an exemplary schematic and shows a smart fob 1, which can be a wireless key 1.

The smart fob or wireless key 1 has a sensor 10, a transceiver 30, and an evaluation unit 20. In the variant shown, a switching element 40 that can be actuated by a user is also provided. The sensor 10, transceiver 30, and switching element 40 are each connected to the evaluation unit 20 in order to enable the evaluation unit 20 to evaluate respective data or signals and control at least the transceiver.

Furthermore, the wireless key 1 has a battery 50, it being possible for a rechargeable battery or an energy producer to be provided instead or in addition. The battery 50 supplies power or energy-requiring components of the wireless key 1 and can be made especially small by virtue of the energy-saving design of the wireless key 1, thus enabling a small installation space and/or a long battery life to be achieved.

In order to make an especially long battery life or a small battery possible, a provision is made that the transceiver 30 takes over the advertising role when establishing the connection, i.e., it does not act as a master itself and leaves this role to its connection partner, i.e., in particular the vehicle.

In the present case, four modes for the transceiver are stored in the evaluation unit 20 into which the transceiver is switched as a function of a movement detected by the sensor 10.

These are a first operating mode A, a second operating mode B, a (first) sleep mode C and a deep sleep mode or second sleep mode D.

In the first operating mode A, no connection has yet been established with a connection partner, and the transceiver 30 transmits advertiser signals on at least one of in particular three advertiser channels.

In the second operating mode B, a connection has been established and the wireless key 1 exchanges data with its connection partner, i.e., the vehicle, via its transceiver 30.

In the first sleep mode C, the transmission of advertiser signals is stopped and a connection with the connection partner is terminated. However, the transceiver 30 is not switched off, or at least not completely, enabling a quick change to the first operating mode A.

The second sleep mode or deep sleep mode D makes a provision that, in addition to the first sleep mode C, the transceiver 30 is switched off, so that an initialization of the transceiver 30 is necessary before changing to the first operating mode A and the change to the first operating mode A takes longer than when starting from the first sleep mode C.

If a connection is established with the connection partner starting from the first operating mode A, a switch to the second operating mode B occurs automatically.

If no movement is detected by the sensor 10 in the first operating mode A or in the second operating mode B for a predetermined period of time or within a predetermined interval, the system switches from the respective operating mode A, B to the first sleep mode C.

If no movement is detected by the sensor 10 in the first sleep mode C for a predetermined second period of time or within a predetermined second interval, the system switches from the first sleep mode C to the second sleep mode D. If, however, the sensor 10 detects a movement or an actuation of the switching element 40, the system switches from the first sleep mode C back to the first operating mode A so that a connection can be established again.

Each detected movement or actuation of the switching element 40 resets a timer for determining the lapsing of the first or second period of time.

The disclosure is not limited in its execution to the abovementioned preferred exemplary embodiments. Rather, a number of variants are conceivable which make use of the illustrated solution even in the form of fundamentally different embodiments.

The invention claimed is:

1. A wireless key for unlocking a vehicle and/or for enabling a function of the vehicle, comprising a sensor for motion detection, an evaluation unit, and a transceiver which is designed to signal its availability as a connection partner and to wirelessly transmit data to a connection partner and/or to receive data from the connection partner;

the transceiver has at least one operating mode and at least one sleep mode where an energy requirement of the transceiver is lower than in the at least one operating mode, the evaluation unit is designed to switch the transceiver from the operating mode to the sleep mode if no movement is detected by the sensor within a predetermined interval and to switch the transceiver from the sleep mode to the operating mode if a movement is detected by the sensor, the transceiver is designed to broadcast advertiser events on at least one advertiser channel to signal availability as a connection partner, the transceiver has a first sleep mode and a second sleep mode, transmission of the advertiser events is stopped in the first sleep mode and a connection with the connection partner is terminated and the transceiver is completely switched off in the second sleep mode, so that the energy requirement of the transceiver is lower in the first sleep mode than in the at least one operating mode and lower in the second sleep mode than in the first sleep mode, the evaluation unit is designed to switch the transceiver from the first sleep mode to the second sleep mode if no movement is detected by the sensor within a predetermined second interval, the transceiver is designed to establish a connection to the connection partner in the first sleep mode and to stop signaling availability as a connection partner, the transceiver is designed not to initialize itself after switching from the first sleep mode to the operating mode and to initialize itself when switching from the second sleep mode to the operating mode, so that the transceiver connects to the connection partner more quickly after switching from the first sleep mode to the operating mode than after switching from the second sleep mode to the operating mode; and an actuatable switching element for enabling the function of the vehicle, the evaluation unit switches the transceiver from the at least one sleep mode to the at least one operating mode when the switching element is actuated.

2. The wireless key according to claim 1, wherein the transceiver is a Near-Field Communication (NFC) and/or Bluetooth Low Energy (BLE) and/or Ultra-Wide Band (UWB) transceiver.

3. The wireless key according to claim 1, wherein the sensor is a motion sensor or an acceleration sensor.

4. A method for saving energy in a wireless key according to claim 1, comprising switching the transceiver by the evaluation unit from the at least one operating mode to the at least one sleep mode if no movement is detected by the sensor within a predetermined interval; and switching the transceiver from the at least one sleep mode to the at least one operating mode if movement is detected by the sensor.

* * * * *